United States Patent

Jaegtnes

[11] B 3,989,408
[45] Nov. 2, 1976

[54] POSITIONING DEVICE FOR A TURBINE ROTOR POSITION SENSOR

[75] Inventor: Karl O. Jaegtnes, Aston, Pa.

[73] Assignee: Westinghouse Electric Corporation, Pittsburgh, Pa.

[22] Filed: May 20, 1974

[21] Appl. No.: 471,735

[44] Published under the second Trial Voluntary Protest Program on February 3, 1976 as document No. B 471,735.

[52] U.S. Cl. .................................. 415/14; 415/118
[51] Int. Cl.² ................... F01D 21/04; F01D 21/06
[58] Field of Search ................... 415/13, 14, 33, 34, 415/118; 91/173, 414; 92/65; 73/37.5

[56] References Cited
UNITED STATES PATENTS

| | | | |
|---|---|---|---|
| 2,888,023 | 5/1959 | Eggenberger | 415/14 |
| 3,002,374 | 10/1961 | Jacobs | 415/118 |
| 3,100,001 | 8/1963 | Forwald | 92/65 |
| 3,603,207 | 9/1971 | Parrett | 91/173 |
| 3,861,818 | 1/1975 | Eggenberger | 415/118 |

FOREIGN PATENTS OR APPLICATIONS

| | | | |
|---|---|---|---|
| 1,249,883 | 9/1967 | Germany | 415/13 |
| 1,141,462 | 12/1962 | Germany | 73/37.5 |
| 1,473,798 | 6/1969 | Germany | 73/37.5 |

*Primary Examiner*—C. J. Husar
*Assistant Examiner*—L. T. Casaregola
*Attorney, Agent, or Firm*—G. H. Telfer

[57] ABSTRACT

A positioning device for varying a predetermined distance between a position sensor element and a rotor member disposed within a turbine apparatus. The positioning device comprises a concentric arrangement of rectilinearly displaceable members biased towards normal positions within a casing. Each member is displaced relative to the casing to either increase or decrease the predetermined distance between the sensor element and the rotor member.

4 Claims, 3 Drawing Figures

POSITIONING DEVICE FOR A TURBINE ROTOR POSITION SENSOR

BACKGROUND OF THE INVENTION

1. Field of the Invention

This invention relates to positioning devices, and in particular, to a device for positioning and varying the distance between a sensor element and a rotor shaft of a turbine apparatus.

Description of the Prior Art

In a large axial flow turbine apparatus, a rotor shaft is rotatably supported at each end thereof in a thrust bearing device. The rotor shaft has a plurality of arrays of rotating blades disposed thereon, each array of rotating blades being disposed a predetermined axial distance from a corresponding array of stationary blades mounted within the turbine casing. For maximum efficiency of the turbine, the rotating and stationary blades are spaced precise axial distances apart. Any axial displacement of the rotor shaft would obviously cause abrasion between the rotating and stationary blades.

For this reason, it is advantageous to know whether or not forces on the rotor member are sufficient to axially displace the rotor with respect to the turbine casing.

In order to dectect whether such axial displacement of the rotor has occurred, the present art disposes a position sensor device a predetermined distance away from a disc member which is mounted on the rotor. The sensing device is mounted on and remains stationary with respect to the turbine casing. Since it is possible for axial displacement of the rotor to occur in certain regions of the turbine, for example, due to thermal expansion of the rotor, the position sensor is disposed within the turbine casing at a point adjacent the thrust bearing. It is disposed at this position where very little axial displacement of the rotor occurs.

The sensor element is capable of both sensing position shifts between it and the rotor and also initiating an associated emergency trip system. Thus, if the position sensor detects a change in the distance between the rotor disc and the position sensor, the emergency trip system will be activated. Activation of the emergency trip system will cut off the supply of elastic fluid through the turbine apparatus and preclude the possibility of the turbine destroying itself due to an excessive axial displacement of the rotor shaft.

At present, only the emergency trip initiation function of the position sensor is testable. There is no arrangement presently available to test whether or not the distance detection function of the sensor is operable.

It is apparent that a device which will permit adjusting the predetermined distance between the sensor element and the rotor disc in order to examine the ability of the sensor to detect axial deflections of the rotor is most advantageous. It is thus seen that the ability to test whether the distance-sensing capabilities of the sensor are operable, in addition to testing the trip initiation capabilities, provides for greater reliability to users of the turbine system embodying the present invention.

Such a positioning device for the sensor element can be utilized to facilitate periodic testing of the rotor emergency trip mechanism. In addition, a device which would change the distances between the position sensor and the rotor disc accurately and under control of an automatic control system, such as a computer, would be clearly superior to any manually operated positioning arrangement. Also, a device which, after measuring the ability of the sensor element to ascertain varying distances between it and a rotor, would return the sensor element to a predetermined normal position is desirable.

SUMMARY OF THE INVENTION

This invention provides a positioning device for a rotor position sensor element within a turbine apparatus. The device comprises a concentric arrangement having an outer casing member disposed stationary to the turbine casing. An intermediate member rectilinearly displaceable relative to the outer casing member and an inner member rectilinearly displaceable relative to the intermediate member are both biased toward normal positions. The sensor element is rigidly attached to the inner member and disposed a predetermined distance from a rotor disc member.

By manipulation of first and second displacement means, the predetermined distance between the sensor element and the rotor disc can be varied. By varying this predetermined distance between the rotor sensor and the rotor disc, the response of the sensor element to the equivalent of an axial displacement of the rotor member can be ascertained.

In addition, after testing, the rotor sensor element is returned to the predetermined distance away from the rotor disc.

It is an object of this invention to provide a positioning device to permit remote and automatically controlled testing of a rotor position sensor element during operation of the turbine apparatus. It is a further object of this invention to provide a positioning device able to accurately vary a predetermined spacing between a sensor element and a rotor member. It is desirable, and thus a further object of this invention, to provide a positioning device which automatically returns the sensor element to a predetermined spacing between it and a rotor member after testing of the sensor element.

BRIEF DESCRIPTION OF THE DRAWINGS

The invention will be more fully understood from the following detailed description taken in connection with the accompanying drawings, in which.

DESCRIPTION OF THE PREFERRED EMBODIMENT

Figure 1:
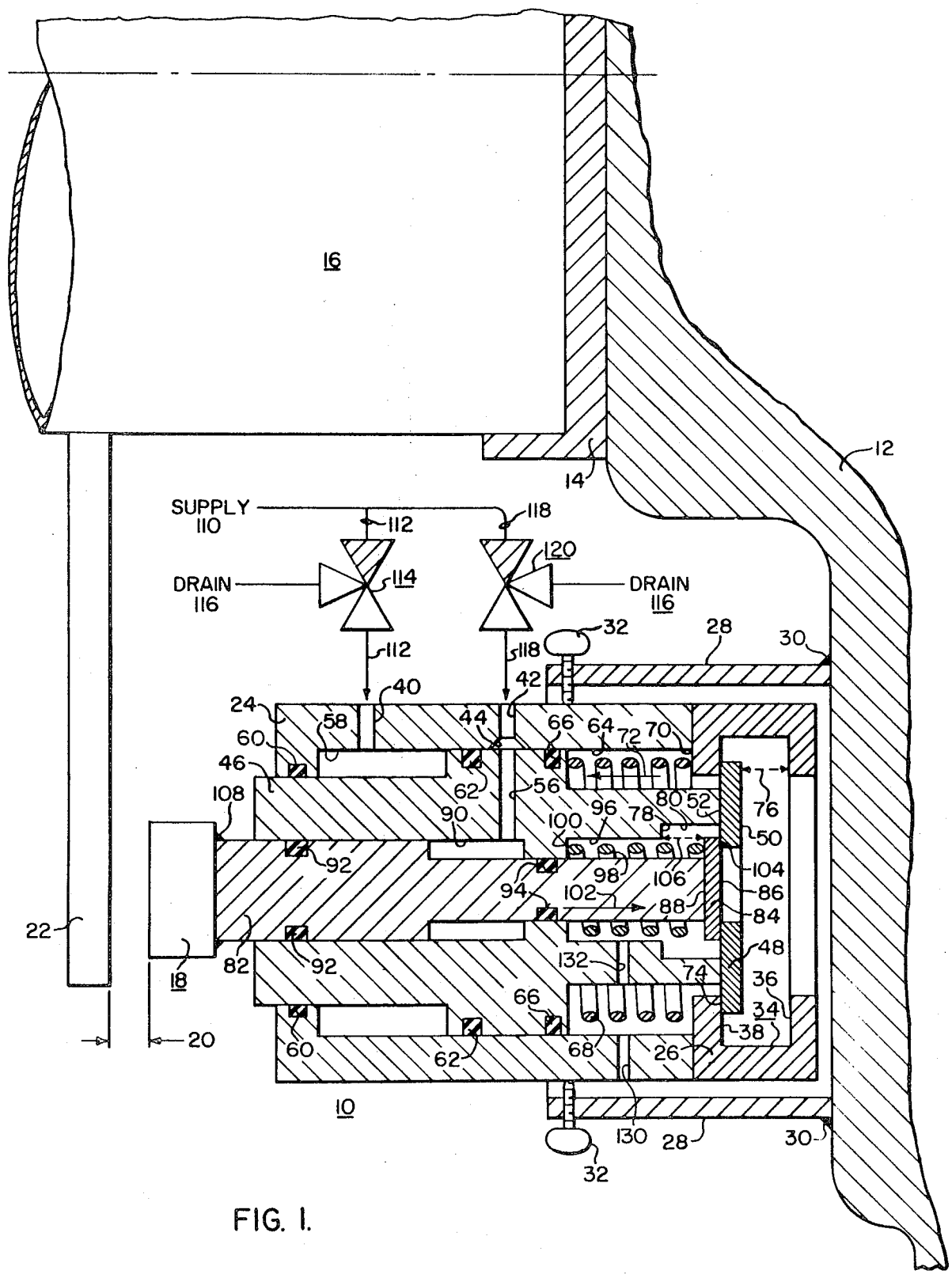
FIG. 1 is an elevational view, partially in section, showing a positioning device taught by this invention.

Throughout the following description, similar reference characters refer to similar elements in all Figures of the drawings.

Referring now to FIG. 1, an elevational view, partially in section, of a positioning device 10 constructed according to the teachings of this invention, is illustrated. In FIG. 1, the positioning device 10 is disposed within a turbine casing 12 adjacent a thrust bearing 14 which rotatably supports a rotor member 16.

As is well known to those skilled in the turbine art, the rotor member 16 has mounted thereon a predetermined number of annular arrays of rotating blades (now shown). As is also well known in the turbine art, these annular arrays of rotating blades are spaced axially a predetermined distance from corresponding arrays of stationary blades mounted within the turbine casing 12. The axial spacings between each adjacent array of rotating and stationary blading is carefully determined and provides for the maximum efficiency of the turbine apparatus.

It is apparent that any axial displacement of the rotor 16 relative to the turbine casing 12 would alter the axial spacing between the rotating and stationary blades. If the axial displacement of the rotor 16 relative to the turbine casing 12 is of sufficient magnitude, the rotating and stationary blades would abrade against each other, severely damaging the turbine apparatus.

It is for this reason that emergency trip means are disposed within the turbine casing in order to prevent the axial displacement of the rotor 16 of a sufficient magnitude to damage the turbine apparatus. One vital element of the emergency trip system is a rotor position sensor. The position sensor is able to detect whether an axial displacement of the rotor member has occurred, and, if so, to initiate the emergency trip system.

The rotor position sensor is usually disposed at a location within the turbine casing where it is expected that little or no axial deflection of the rotor will occur. It is well known, for example, that in some regions of the turbine the rotor may expand due to differential thermal expansion. However, little or no axial displacement of the rotor is expected within the region adjacent the thrust bearings. As seen in FIG. 1, it is in this region that a rotor position sensor 18 is disposed. The position sensor 18 is placed a predetermined distance 20 from a disc member 22 securely attached to the rotor 16.

In the prior art, the sensor element is rigidly mounted to the turbine casing in the area of the thrust bearing, and no provision is made for varying the distance between the sensor and the disc member in order to ascertain whether or not the sensor element is properly functioning.

The positioning device 10 has an elongated cylindrical outer casing 24 having a base plate 26 thereon. The outer cylinder 24 is movably mounted on a bracket member 28. The bracket 28 is itself securely attached to the turbine casing 12 by suitable attachment means such as a weld 30. When initially installed, the positioning device 10 is moved to the desired location on the bracket 28 which provides the desired predetermined distance 20 between the sensor element 18 and the rotor disc 22. The positioning device 10 is then secured in the desired location on the bracket 28 by a lock nut 32.

The base plate 26 has a notch 34 therein. The notch 34 has a right hand face 36 and a left hand face 38, as viewed in FIG. 1.

The outer casing 24 has a first passage 40 extending therethrough. A second passage 42 extends through the outer casing 24 and is displaced a predetermined axial distance on the outer casing 24 from the first passage 40. The second passage 42 has a flared portion 44 disposed near the inner diameter of the outer cylindrical casing 24.

The outer cylindrical casing member 24 axially and concentrically surrounds an elongated, substantially cylindrical sleeve member 46. The sleeve 46 is rectilinearly movable within the outer cylindrical casing 24. The sleeve 46 has an annular base plate member 48.

The base plate 48 is disposed within the notch 34 of the base plate 26. The base plate 48 has a right hand surface 50 and a left hand surface 52 thereon, the left hand surface 52 extending radially past the end of the sleeve 46 as illustrated in FIG. 1.

A passage 56 extends through the sleeve member 46 and is disposed in such a position within the sleeve 46 so as to communicate with the flared portion 44 of the second passage 42 of the outer casing 24. As is seen from FIG. 1, provision of the flared portion 44 of the second passage 42 permits constant communication between the passages 42 and 56 even when the sleeve 46 is rectilinearly displaced relative to the outer casing 24.

The outer cylindrical casing 24 and the sleeve 46 define a first, substantially pressure tight chamber 58 therebetween. The first pressure tight chamber 58 communicates with the first passage 40 which extends through the outer cylindrical casing 24. A pair of O-rings 60 and 62 are provided to insure that the first chamber 58 remains substantially pressure tight.

The outer cylindrical casing 24 and the cylindrical sleeve 46 define a first spring chamber 64 therebetween. A third O-ring 66 is disposed axially between the first spring chamber 64 and the passage 56. The first spring chamber 64 has first bias means, commonly a compression spring 68, disposed therein. The first spring 68 abuts at one end thereof against the base plate 26 of the stationary outer cylindrical casing 24, as illustrated by reference numeral 70. The first compression spring 68 abuts at the opposite end thereof against the sleeve member 46, thus exerting a biasing force on the sleeve 46 in a direction indicated by reference arrow 72. Thus, the first compression spring 68 biases the sleeve member toward a first position relative to the outer casing 24.

When the sleeve 46 is biased toward its first position relative to the outer casing 24, an abutment 74 is established between the left hand surface 52 of the base plate 48 and the left hand face 38 of the notch 34. This abutment is illustrated by reference numeral 74. As is apparent in FIG. 1, an axial distance 76 is extant between the right hand surface 50 of the base plate 48 and the right hand surface 36 of the notch 34.

The sleeve 46 has a step 78 cut on the inner diameter near the right end thereof. The step 78 and the left hand surface 52 of the base plate 48 define a notch 80 on the sleeve member 46.

An elongated cylindrical shaft or spool member 82 is rectilinearly displaceable within the sleeve 46 and is concentric to both the sleeve 46 and the outer casing 24. The spool 82 has a base plate 84 attached thereto, the base plate 84 being disposed within the notch 80 defined on the sleeve 46. The base plate 84 has a right hand surface 86 and a left hand surface 88 thereon.

The sleeve 46 and the spool 82 define a second substantially pressure tight chamber 90 therebetween. The second pressure tight chamber 90 communicates with the passage 56 extending through the sleeve member 46. A pair of O-rings 92 and 94 are disposed on the spool 82 and ensure that the second chamber 90 remains substantially pressure tight.

The sleeve 46 and the spool 82 define a second spring chamber 96 therebetween. Second bias means, commonly a second compression spring 98, is disposed within the second spring chamber 98. The second compression spring 98 abuts at the left end thereof, as viewed in FIG. 1, against the sleeve 46, as illustrated by numeral 100. The second compression spring 98 exerts a force in the direction 102 to bias the spool 82 toward a first position relative the sleeve 46. This first position of the spool 82 relative to the sleeve 46 is characterized by an abutment 104 between the right hand surface 86 of the base plate 84 and the left hand surface 52 of the base plate 48. An axial distance 106 is extant within the notch 80 between the step 78 and the left hand surface 88 of the base plate 84.

The sensor element 18 is securely mounted on the spool 82 by suitable attachment means such as weld 108. It is thus seen that the sensor element 18 remains the predetermined distance 20 from the rotor disc 22 when the spool 82 and the sleeve 46 are both biased to their first positions within the outer casing 24. The initial displacement 20 between the sensor 18 and the rotor disc 22 can be precisely set merely by positioning the outer casing 24 at the desired location on the bracket 28 and securing the lock nut 32.

However, as an added feature, the distance 20 between the sensor element 18 and the rotor disc 22 can be varied by displacing either the sleeve member 46 from its first position relative to the outer casing 24 or by displacing the spool member 82 from its first position relative to the sleeve member 46.

Suitable means for rectilinearly displacing the sleeve member 46 relative to the outer casing 24 and suitable means for rectilinearly displacing the spool 82 relative to the sleeve 46 are provided.

The first substantially pressure tight chamber 58 communicates with a pressurized fluid supply diagrammatically illustrated by reference numeral 110 through suitable conduit means 112. The pressurized fluid flow from the supply 110 to the first pressure tight chamber 58 is conducted through the passage 40 disposed within the outer casing 24. A first three-position solenoid valve 114 controls the amount of pressurized fluid introduced into the first pressure tight chamber 58. Fluid within the first pressure tight chamber 58 may be drained therefrom by changing a setting on the first valve 114 to permit communication between the first pressure tight chamber 58 and a fluid drain reservoir 116.

Similarly, the second pressure tight chamber 90 communicates with the supply reservoir 110 through suitable conduit means 118. The flow of pressurized fluid from the supply 110 to the second pressure tight chamber 90 passes through the second passage 42 on the outer cylinder 24 and through the passage 56 disposed within the sleeve member 46. The flow of pressurized fluid into the second pressure tight chamber 90 is controlled by a second three-position solenoid valve 120. Pressurized fluid disposed within the second pressure tight chamber 90 can be conducted to the drain 116 by setting the second valve 120 so that the drain 116 communicates with the second pressure tight chamber 90. Both the first solenoid valve 114 and the second solenoid valve 120 are controlled by suitable governor means (not shown).

Vents 130 and 132 are disposed in the outer casing 24 and the sleeve 46 respectively and permit fluid accumulated in the spring chambers 64 and 96 to drain therefrom.

During normal operation of the turbine apparatus, both the first solenoid valve 114 and the second solenoid valve 120 are de-energized, as illustrated by the shaded settings on the valves 114 and 120 in FIG. 1, and the first pressure tight chamber 58 and the second pressure tight chamber 90 both communicate with the drain 116. During this period of normal operation, the sensor element 18 is disposed the predetermined distance 20 from the rotor disc 22, and is prepared to monitor the position of the rotor disc 22 and to detect an excessive axial displacement of the rotor member 16. If axial displacement of the rotor 16 were to occur, the sensor element 18 would detect such axial displacement and would initiate an emergency trip system (not shown) to protect the turbine element.

In the prior art, testing of only the trip initiation function of the sensor element 18 is possible, since no available method of testing the position indicating function of the sensor element 18 is available. However, by utilization of the positioning device 10 taught by this invention, the position sensing function of the sensor element 18, in addition to the trip initiation function, may be tested. Rectilinear displacement in response to the governor means (not shown) of either the sleeve member 46 or the spool member 82 will result in varying the predetermined distance 20 between the sensor element 18 and the rotor disc 22, thus simulating an axial displacement of the rotor 16.

That is to say, the position indicating function of the sensor element 18 can be remotely tested either by moving the sensor element 18 toward the rotor disc 22 to narrow the distance 20 between the sensor element 18 and the rotor disc 22 or by moving the sensor element 18 away from the rotor disc 22 to widen the distance 20 between the sensor element 18 and the rotor disc 22. It is apparent that varying the distance 20 between the sensor element 18 and the rotor disc 22 has the effect of simulating an axial displacement of the rotor 16. Thus, the position sensing function of the sensor element 18 can be tested.

Figure 2:
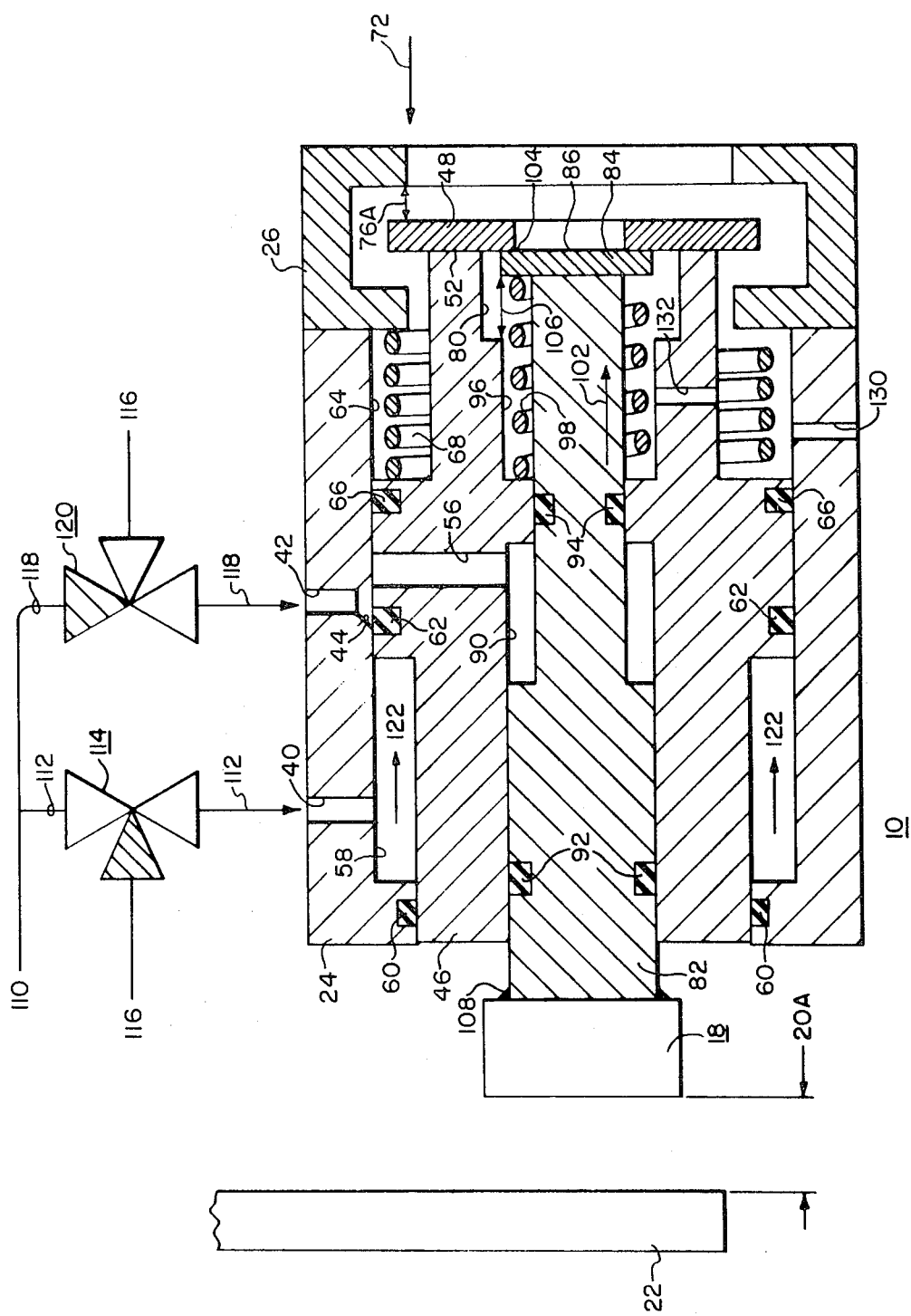
FIG. 2 is a view similar to FIG. 1, with portions removed for clarity, showing the positioning device in a first activated configuration; and, FIG. 3 is a view, similar to FIG. 1, with portions removed for clarity showing the positioning device in a second activated configuration.

Referring now to FIG. 2, in order to increase the predetermined distance 20 between the sensor element 18 and the rotor disc 22, the sleeve 46 is rectilinearly displaced from its first position relative to the outer casing 24 to a second position relative to the outer casing 24. The displacement of the sleeve 46 is accomplished by energizing the first solenoid valve 114 remotely from the governor means (not shown). Energization of the first solenoid valve 114, as illustrated in FIG. 2 by shading the appropriate setting of the valve 114, permits pressurized fluid from the fluid supply reservoir 110 to pass through the conduit means 112 and through the first passage 40 disposed within the outer casing 24 into the first pressure tight chamber 58.

Introduction of pressurized fluid into the first substantially pressure tight chamber 58 causes a pressure build-up within the first pressure tight chamber 58. Such pressure build-up within the first pressure tight chamber 58 exerts a force on the sleeve member 46 in a direction 122.

The force exerted by the pressure build-up in the first chamber 58 is directed opposite to the direction 72 of the first bias force that is imposed upon the sleeve member 46 by the first compression spring 68. By regulating the flow of pressurized fluid into the first pressure tight chamber 58, the force within the first pressure tight chamber 58 acting in direction 122 can be made greater than the force exerted by the first compression spring 68 on the sleeve 46 acting in direction 72. Since there is an unbalance of forces imposed upon the sleeve 46, the sleeve 46 is rectilinearly displaced from its first position relative to the outer casing 24. Thus, the abutment 74 between the base plate 48 and the base plate 26 is opened, and the distance 76 (FIG. 1) decreases to a lesser distance 76A.

Since the second pressure tight chamber 90 is still connected to the drain 116, as illustrated by shading the appropriate setting of the valve 120, the force imposed upon the spool 82 by the second compression spring 98 continues to act in direction 102 to maintain the spool 82 in its first position relative to the sleeve 46. Thus, the abutment 104 (FIG. 1) between surfaces 86 and 52 of baseplates 84 and 48 respectively remains intact.

It is thus seen that by rectilinearly displacing the sleeve 46 relative to the outer casing 24 the predetermined distance 20 between the sensor element 18 and the rotor disc 22 increases to a distance 20A. Such an increase in distance between the sensor element 18 and the rotor disc 22 simulates an axial displacement of the rotor shaft 16 to the left, and thus enables testing of both the position sensing function and the trip initiation function of the sensor element 18.

To reestablish the predetermined distance 20 between the sensor element 18 and the rotor disc 22, the governor means de-energizes the first solenoid 114 to permit the first pressure tight chamber 58 to communicate with the drain reservoir 116. As the pressurized fluid is withdrawn from the first pressure tight chamber 58, the force exerted on the sleeve 46 in the direction 122 diminishes, and the force exerted on the sleeve 46 by the first compression spring 68 in the direction 72 again becomes dominant, thus rectilinearly displacing the sleeve 46 towards its first position relative to the outer casing 24. When the abutment 74 (FIG. 1) is re-established, the sensor element 18 will be accurately returned to the predetermined distance 20 of the rotor disc 22.

Figure 3:
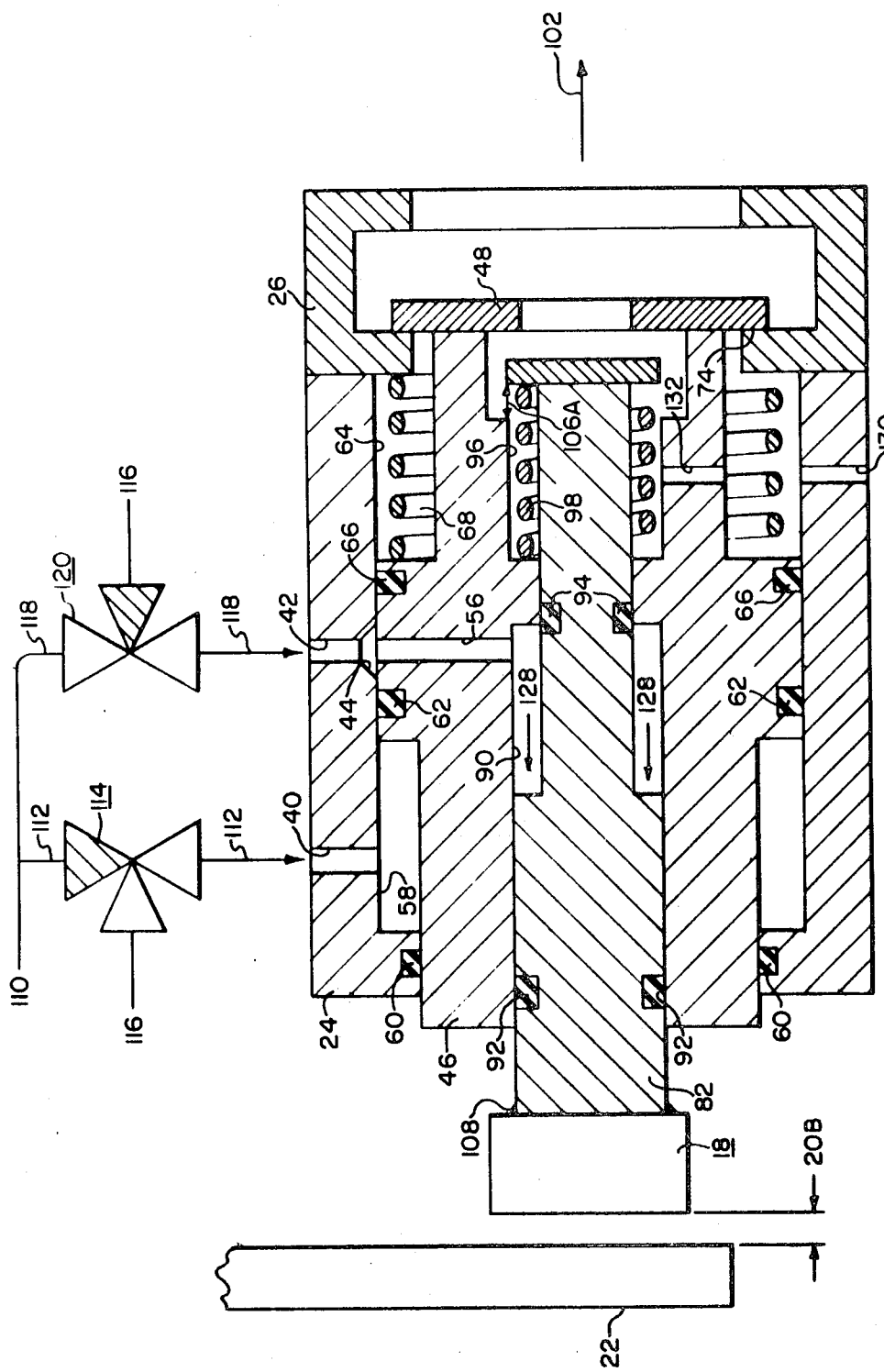

Referring now to FIG. 3, in order to decrease the predetermined distance 20 between the sensor element 18 and the rotor disc 22, the governor means activates the second solenoid valve 120 so as to permit communication between the second pressure tight chamber 90 and the fluid supply reservoir 110. Opening of the second solenoid valve 120, as illustrated by shading the appropriate setting of valve 120, permits a flow of pressurized fluid to pass through the conduit members 118, through the second passage 42 extending through the outer casing 24, and through the passage 56 extending through the sleeve 46, into the second pressure tight chamber 90. An accumulation of pressurized fluid within the second pressure tight chamber 90 will result in a pressure force being exerted upon the spool 82 in a direction indicated by reference arrow 128. The force within the second pressure tight chamber 90 acts on the spool 82 in a direction opposite to that imposed on the spool 82 by the second compression spring 98.

As the pressurized fluid within the second pressure tight chamber 90 increases, the force exerted on the spool 88 in the direction 128 becomes greater than that imposed upon the spool 82 by the second compression spring 98. Since an unbalance of forces exist on the spool 82, the spool is rectilinearly displaced from its first position relative to the sleeve 46. The abutment 104 (FIG. 1) between the surface 86 of the base plate 84 and between the surface 52 of the base plate 48 is broken and the distance 106 (FIG. 1) between the base plate 84 and the step 78 decreases to the lesser distance 106A.

Since the first pressure tight chamber 58 is still connected to the drain 116, as illustrated by shading the appropriate setting of the valve 114, the force imposed on the sleeve 46 by the first compression spring 68 continues to act in the direction 72 (FIG. 1) to maintain the sleeve 46 in its first position relative to the outer casing 24. Thus, the abutment 74 between the base plate 48 and the base plate 26 remains intact.

It is thus seen that by rectilinearly displacing the spool 82 relative to the sleeve 46, the sensor element 18 mounted on the spool 82 is moved closer to the rotor disc 22. By moving the sensor element 18 closer to the rotor disc 22, the predetermined distance 20 between the sensor element 18 and the rotor disc 22 is decreased, as illustrated by reference numeral 20B in FIG. 3. Decrease of the predetermined distance 20 between the sensor element 18 and the rotor disc 22 simulates an axial displacement of the rotor member 16 to the right. It is thus seen that the position indicating function and the trip initiation function of the sensor element 18 can thus be remotely tested.

The initial predetermined distance 20 between the sensor element 18 and the rotor disc 22 can be accurately re-established by de-energization of the second solenoid valve 120. With the second solenoid valve de-energized, pressurized fluid within the second pressure tight chamber 90 drains to the fluid reservoir 116. As the pressurized fluid drains from the second pressure tight chamber 96, the force on the spool 82 in the direction 128 diminishes and the force exerted on the spool 82 in the direction 102 by the second compression spring 98 again becomes dominant. Thus, the spool 82 is impelled back toward its first position relative to the sleeve 46 and the abutment 104 which characterizes that the first position between the sleeve 46 and the spool 82 is re-established. With the abutment 104 between the base plates 84 and 48 re-established, the sensor element 18 is again disposed the predetermined distance 20 from the rotor disc 22.

It is thus seen that the predetermined distance 20 between the sensor element 18 and the rotor disc 22 can be varied so that a separation distance between the rotor sensor element 18 and the rotor disc 22 equal to the distance 20 minus the distance 106 can be obtained. Similarly, the distance between the sensor element 18 and the rotor disc 22 can be increased to a distance equal to the distance 20 plus the distance 76.

It is seen that the maximum distance 20A between the sensor element 18 and the rotor disc is obtained when the first solenoid valve 114 is energized and the second solenoid valve 120 de-energized, thus permitting the first pressure tight chamber 58 to communicate with the supply reservoir 110 and permitting the second pressure tight chamber 90 to communicate with the drain 116. The minimum distance 20B between the sensor element 18 and the rotor disc 22 is obtained with the second solenoid valve 120 energized and the first solenoid valve 114 de-energized. This permits the second pressure tight chamber 90 to communicate with the supply reservoir 110 while the first pressure tight chamber 58 communicates with the drain 116. Of course, both solenoid valves 114 and 120 can be controlled by the governor means (not shown) so as to accurately provide a distance between the sensor element 18 and the rotor disc 22 anywhere between the maximum limit 20A and minimum limit 20B. In addition, deenergization of both solenoid valves 114 and 120, thus permitting the first pressure tight chamber 58 and the second pressure tight chamber 90 to communicate with the drain 116, automatically returns the sensor element 18 to the predetermined distance 20 from the rotor disc 22.

It is seen that utilization of a position indicating device as taught by this invention within a turbine apparatus permits remote testing of the position sensor element 18 while the turbine apparatus is operational. By rectilinearly displacing either the sleeve 46 or the spool 82, the distance between the sensor element 18 and the rotor disc 22 is accurately varied, thus permitting a determination of the reliability of the position sensing function of the sensor element 18.

I claim as my invention:

1. A device for positioning a turbine rotor position sensor, said sensor monitoring the location and detecting axial movement of a rotor member disposed within a turbine apparatus, said device comprising:

an outer casing member, an intermediate member surrounded by said outer casing member, said intermediate member being rectilinearly movable relative to said outer casing member, first bias means for biasing said intermediate member toward a first position relative to said outer casing member, a solid inner member surrounded by said intermediate member, said inner member being rectilinearly movable relative to said intermediate member, said sensor mounted on said inner member, second bias means for biasing said inner member toward a first position relative to said intermediate member, said sensor being disposed a predetermined distance from said rotor member, first displacement means for displacing said intermediate member from said first position relative to said outer casing member to a second position relative to said outer casing member, said inner member remaining in said first position relative to said intermediate member during said displacement of said intermediate member relative to said outer casing member, said predetermined distance between said sensor and said rotor member being changed by said displacement of said intermediate member relative to said outer casing member, second displacement means for displacing said inner member from a first position relative to said intermediate member to a second position relative to said intermediate member, said intermediate member remaining in said first position relative to said outer casing member during said displacement of said inner member relative to said intermediate member, said predetermined distance between said sensor and said rotor being changed by said displacement of said inner member relative to said intermediate member.

2. The device for positioning a turbine rotor position sensor of claim 1, wherein:

said outer casing member comprises an elongated cylinder member, said outer cylinder member being securely fixed in a stationary position relative to said turbine apparatus, said intermediate member comprises an elongated, substantially cylindrical sleeve member, said sleeve member being axially surrounded by and concentric with said outer cylinder, said sleeve member being rectilinearly movable relative to said outer cylinder member, said inner member comprises an elongated cylindrical shaft member, said shaft member being axially surrounded by said sleeve member and concentric with said outer cylinder member and said sleeve member, said shaft member being rectilinearly movable relative to said sleeve member, said sensor securely affixed to said shaft member, a first spring chamber is defined between said outer cylinder member and said sleeve member, a first substantially pressure tight chamber is defined between said outer cylinder member and said sleeve member, a second spring chamber is defined between said sleeve member and said shaft member, a second substantially pressure tight chamber is defined between said sleeve member and said shaft member, said first bias means comprises a first compression spring disposed within said first spring chamber, said first spring exerting a force on said sleeve member tending to keep said sleeve member in said first position relative to said outer cylinder member, said second bias means comprises a second compression spring disposed within said second spring chamber, said second spring exerting a force on said shaft member tending to keep said shaft member in said first position relative to said sleeve member, said first displacement means comprises, passage means extending through said outer cylinder member to permit introduction of a pressurized fluid into said first pressure tight chamber, and, first control means for controlling said introduction of pressurized fluid into said first pressure tight chamber, said pressurized fluid within said first pressure tight chamber exerting a force on said sleeve member greater than and in opposition to the force exerted on said sleeve member by said first spring to move said sleeve member away from said first position relative to said outer cylinder member toward a second position relative to said outer cylinder member, said shaft member remaining in said first position relative to said sleeve member during said displacement of said sleeve member relative to said outer cylinder member, said distance between said sensor member and said rotor member changing during said displacement of said sleeve member relative to said outer cylinder member, and, said second displacement means comprises, passage means extending through said outer cylinder member and through said sleeve member to permit introduction of a pressurized fluid into said second pressure tight chamber, and, second control means for controlling said introduction of pressurized fluid into said second pressure tight chamber, said pressurized fluid within said second pressure tight chamber exerting a force on said shaft member greater than and in opposition to the force exerted on said shaft member by said second spring to move said shaft member away from said first position relative to said sleeve member toward a second position relative to said sleeve member, said sleeve member remaining in said first position relative to said outer cylinder member during said displacement of said shaft member relative to said sleeve member, said distance between said sensor and said rotor member changing during said displacement of said shaft member relative to said sleeve member.

3. The device for positioning a rotor position sensor of claim 1, wherein:

said predetermined distance between said sensor and said rotor member increases during said displacement of said intermediate member relative to said outer casing member, and, said predetermined distance between said sensor and said rotor member decreases during said displacement of said inner member relative to said intermediate member.

4. The device for positioning a rotor position sensor of claim 2, wherein:

said predetermined distance between said sensor and said rotor member increases during displacement of said sleeve member relative to said outer cylinder member, and said predetermined distance between said sensor and said rotor member decreases during said displacement of said shaft member relative to said sleeve member.

* * * * *